United States Patent
Shingai (10) Patent No.: US 8,666,286 B2
(45) Date of Patent: Mar. 4, 2014

(54) IMAGE READING DEVICE AND IMAGE FORMING APPARATUS HAVING THE SAME

(75) Inventor: Hiroyuki Shingai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 109 days.

(21) Appl. No.: 13/423,414

(22) Filed: Mar. 19, 2012

(65) Prior Publication Data

US 2013/0026708 A1 Jan. 31, 2013

(30) Foreign Application Priority Data

Jul. 25, 2011 (JP) ................... 2011-162248

(51) Int. Cl.
*G03G 15/00* (2006.01)
*H04N 1/00* (2006.01)

(52) U.S. Cl.
USPC ................ 399/151; 358/474; 399/75; 399/88

(58) Field of Classification Search
USPC .............. 399/151, 75, 88; 358/474, 296, 497
See application file for complete search history.

(56) References Cited

U.S. PATENT DOCUMENTS

| | | | |
|---|---|---|---|
| 4,320,954 A * | 3/1982 | Ikeda et al. | 399/75 |
| 4,649,437 A | 3/1987 | Watanabe | |
| 7,306,216 B2 * | 12/2007 | Lee et al. | 271/10.01 |
| 2002/0131092 A1 * | 9/2002 | Tanaka et al. | 358/474 |
| 2013/0016404 A1 * | 1/2013 | Yap et al. | 358/296 |

FOREIGN PATENT DOCUMENTS

JP 61-118061 6/1986

* cited by examiner

*Primary Examiner* — Sophia S Chen
(74) *Attorney, Agent, or Firm* — Banner & Witcoff, Ltd.

(57) ABSTRACT

An image reading device is provided, which includes a controller configured to, when a carriage reaches a turn-around position in a moving direction, control a motor to once stop, then rotate in a second direction opposite to a first direction such that a planetary gear swings to a position separated from an output gear and that an intermediate gear moves to an engagement position to engage with the output gear, and thereafter again rotate in the first direction so as to transmit a driving force from the motor to the output gear via an input gear, a planetary gear, and the intermediate gear.

10 Claims, 7 Drawing Sheets

VIEW ALONG DIRECTION OF ARROW A

IMAGE READING DEVICE AND IMAGE FORMING APPARATUS HAVING THE SAME

CROSS-REFERENCE TO RELATED APPLICATION

This application claims priority under 35 U.S.C. §119 from Japanese Patent Application No. 2011-162248 filed on Jul. 25, 2011. The entire subject matter of the application is incorporated herein by reference.

BACKGROUND

1. Technical Field

The following description relates to one or more image reading devices and one or more image forming apparatuses.

2. Related Art

An image forming apparatus has been known that is configured to supply a driving force to one of a movable portion of an image forming unit and a movable portion of an image reading device from a single electric motor when controlling the electric motor to rotate in a normal direction or a reverse direction and controlling a one-way clutch to intermittently establish a transmission pathway of the driving force.

SUMMARY

According to the known image forming apparatus, it is possible to reduce a manufacturing cost of the apparatus since the movable portions of the image forming unit and the image reading device are supplied with the driving force from the single electric motor.

Aspects of the present invention are advantageous to provide one or more improved techniques for an image reading device and an image forming apparatus which techniques provide one or more novel configurations, different from the configuration of the known image forming apparatus, to supply a driving force to one of a movable portion of an image forming unit and a movable portion of the image reading unit from a single electric motor.

According to aspects of the present invention, an image reading device is provided, which includes a carriage configured to reciprocate between a first end and a second end in a moving direction to read a document sheet, a motor configured to supply a driving force to move one of the carriage and a movable member other than the carriage, an input gear configured to rotate upon receiving the driving force from the motor, an output gear configured to output a rotational force toward the carriage, a planetary gear configured to rotate in engagement with the input gear, the planetary gear being supported to be swingable around a rotational center axis of the input gear between a position where the planetary gear engages with the output gear and a position where the planetary gear is separated from the output gear, an intermediate gear movable between an engagement position where the intermediate gear engages with the output gear and a separated position where the intermediate gear is separated from the output gear, the intermediate gear being configured to, when being in the engagement position, engage with the planetary gear, reverse a rotational direction of the driving force transmitted to the planetary gear, and transmit the driving force to the output gear, a displacement mechanism configured to apply an urging force to urge the intermediate gear toward the engagement position and move the intermediate gear in response to movement of the carriage, and a controller configured to control the motor. When the carriage is moved from the first end to the second end in the moving direction, the displacement mechanism moves the intermediate gear from the engagement position to the separated position in response to the movement of the carriage, and the controller controls the motor to rotate in a first direction so as to transmit the driving force from the motor to the output gear via the input gear and the planetary gear. When the carriage reaches the second end in the moving direction, the controller controls the motor to once stop, then rotate in a second direction opposite to the first direction such that the planetary gear swings to the position separated from the output gear and that the intermediate gear is moved to the engagement position by the urging force from the displacement mechanism, and thereafter again rotate in the first direction so as to transmit the driving force from the motor to the output gear via the input gear, the planetary gear, and the intermediate gear.

According to aspects of the present invention, further provided is an image forming apparatus that includes an image forming unit including a movable member, the image forming unit being configured to form an image on a sheet, an image reading device including a carriage configured to reciprocate between a first end and a second end in a moving direction to read a document sheet, and a single motor configured to supply a driving force to move one of the movable member of the image forming unit and the carriage of the image reading device. The image reading device further includes an input gear configured to rotate upon receiving the driving force from the motor, an output gear configured to output a rotational force toward the carriage, a planetary gear configured to rotate in engagement with the input gear, the planetary gear being supported to be swingable around a rotational center axis of the input gear between a position where the planetary gear engages with the output gear and a position where the planetary gear is separated from the output gear, an intermediate gear movable between an engagement position where the intermediate gear engages with the output gear and a separated position where the intermediate gear is separated from the output gear, the intermediate gear being configured to, when being in the engagement position, engage with the planetary gear, reverse a rotational direction of the driving force transmitted to the planetary gear, and transmit the driving force to the output gear, a displacement mechanism configured to apply an urging force to urge the intermediate gear toward the engagement position and move the intermediate gear in response to movement of the carriage, and a controller configured to control the motor. When the carriage is moved from the first end to the second end in the moving direction, the displacement mechanism moves the intermediate gear from the engagement position to the separated position in response to the movement of the carriage, and the controller controls the motor to rotate in a first direction so as to transmit the driving force from the motor to the output gear via the input gear and the planetary gear. When the carriage reaches the second end in the moving direction, the controller controls the motor to once stop, then rotate in a second direction opposite to the first direction such that the planetary gear swings to the position separated from the output gear and that the intermediate gear is moved to the engagement position by the urging force from the displacement mechanism, and thereafter again rotate in the first direction so as to transmit the driving force from the motor to the output gear via the input gear, the planetary gear, and the intermediate gear.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an image forming apparatus 1 of an embodiment according to aspects of the present invention will be described with reference to the accompanying drawings.

1. General Overview of Image Forming Apparatus

Figure 1:
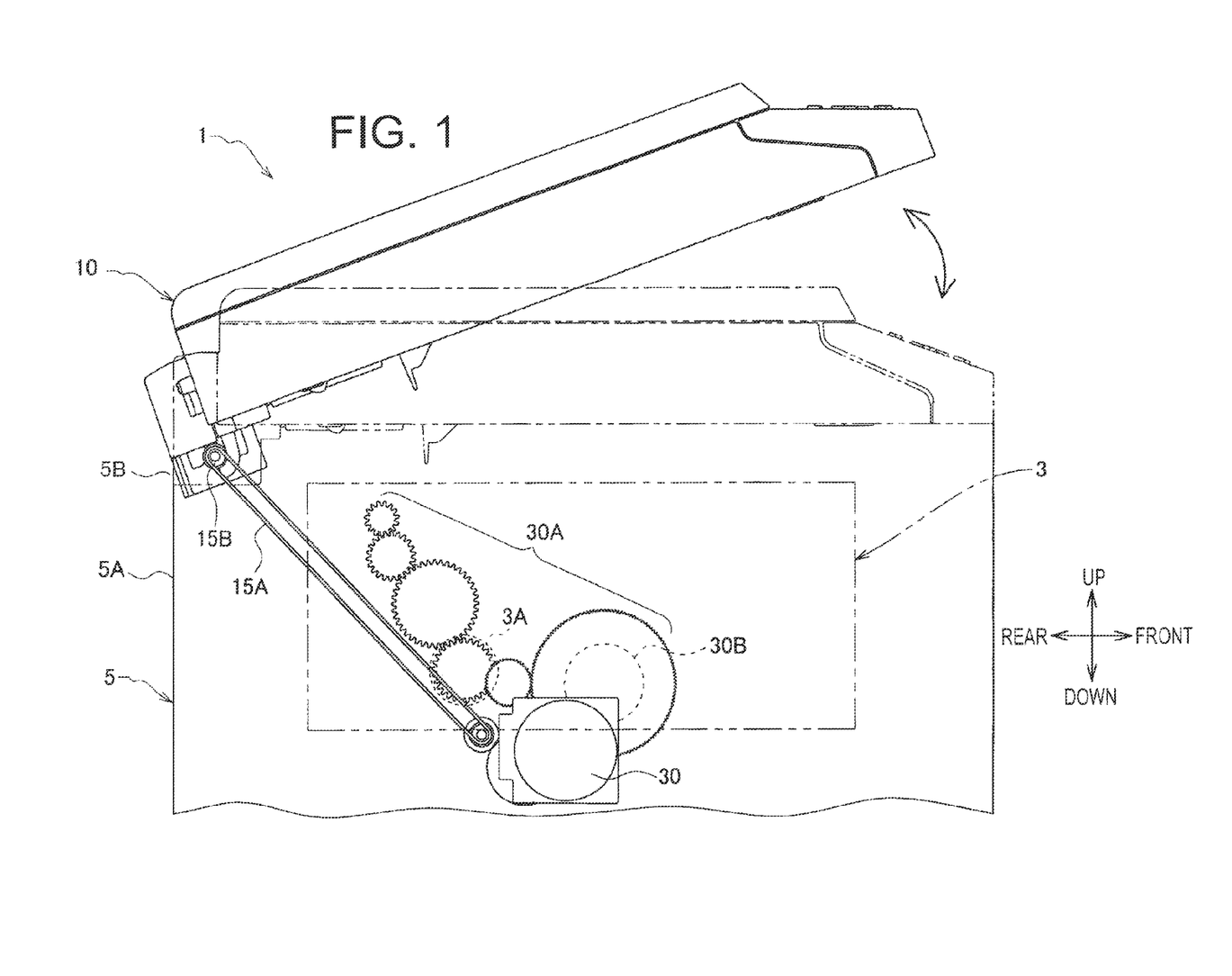
FIG. 1 is a side view schematically showing a configuration of an image forming apparatus in an embodiment according to one or more aspects of the present invention.

As shown in FIG. 1, the image forming apparatus 1 includes a printing unit 5 that incorporates therein an image forming device 3 configured to form an image on a sheet (such as a recording paper and a transparency for an overhead projector), and a scanning unit 10 configured to read an image formed on a document sheet. In the embodiment, the scanning unit 10 is swingably attached to an upper side of the printing unit 5.

The image forming device 3 is an electrophotographic image forming device that includes a photoconductive drum 3A configured to transfer a developer image onto a sheet, an exposure unit (not shown) configured to expose the photoconductive drum 3A, and a fixing unit (not shown) configured to thermally fix the developer image transferred onto the sheet.

Further, in a housing 5A of the printing unit 5, there are housed a plurality of feed rollers (not shown) configured to feed a sheet, as well as the image forming device 3. The feed rollers and the photoconductive drum 3A are rotated by a driving force from a single electric motor 30 via a gear unit 30A including a plurality of gears.

A transmission pathway of the driving force from the electric motor 30 to the photoconductive drum 3A includes an upstream transmission pathway that is located upstream relative to the photoconductive drum 3A on the transmission pathway. On the upstream transmission pathway, disposed is a one-way clutch 30B configured to transmit a rotational driving force in one direction to the photoconductive drum 3A and block a rotational driving force in the other direction.

2. Configuration of Scanning Unit 2.1 Schematic Configuration of Scanning Unit

The scanning unit 10 of the embodiment is a flatbed image reader configured to read out an image of a document sheet statically placed on a transparent platen (not shown).

There is an image sensor (not shown) disposed on a side opposed to the document sheet across the platen (i.e., under the platen). The image sensor is configured to receive light incident onto and then reflected by the document sheet and issue electrical signals based on the received light. The scanning unit 10 is configured to read an image (such as characters) formed on the document sheet by converting the image into electrical signals using the image sensor.

Figure 2A:
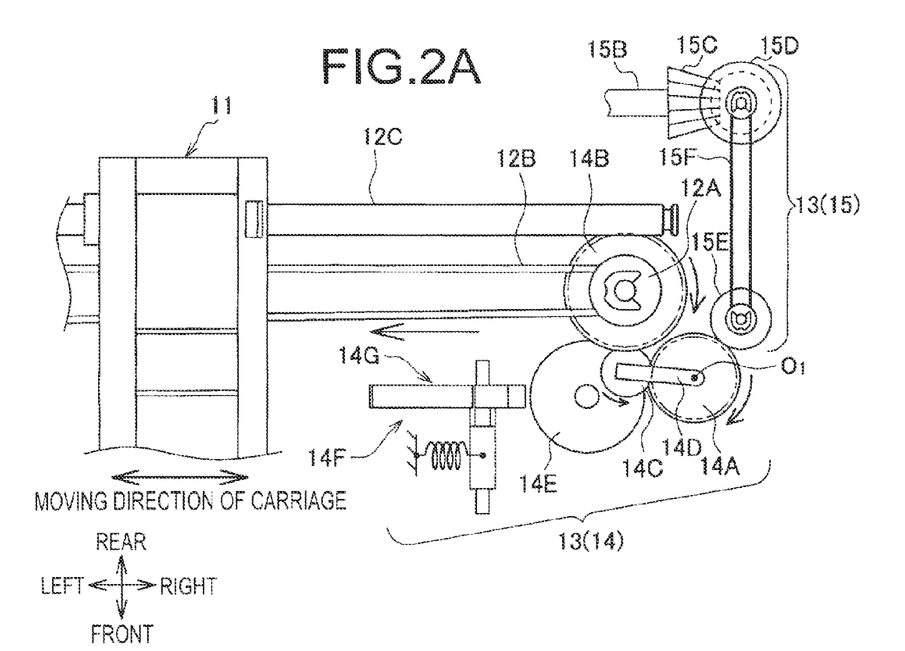
FIG. 2A is a top view illustrating operations of the image forming apparatus in the embodiment according to one or more aspects of the present invention.

In the embodiment, a contact image sensor is employed as the image sensor. As shown in FIG. 2A, the image sensor is mounted on a carriage 11 configured to reciprocate along a left-to-right direction (as defined in FIG. 2A). In an image reading operation, the image sensor reads the image while moving beneath the platen.

Further, the carriage 11 is connected with a belt 12B wound around a pair of pulleys, i.e., a driving pulley 12A disposed at a first end (in the embodiment, the right end) in a moving direction of the carriage 11 and a driven pulley (not shown) disposed at a second end (in the embodiment, the left end) in the moving direction of the carriage 11. When the driving force from the electric motor 30 is transmitted to the driving pulley 12A via a driving force transmission mechanism 13, the carriage 11 is guided by a guide shaft 12C and translated in the horizontal direction.

The driving pulley 12A and the guide shaft 12C are fixedly attached to a housing (not shown) that forms a framework of the scanning unit 10. Further, the housing (hereinafter referred to as a scanner main body) is attached to the housing 5A of the printing unit 5 via a hinge mechanism 5B (see FIG. 1).

Figure 2B:
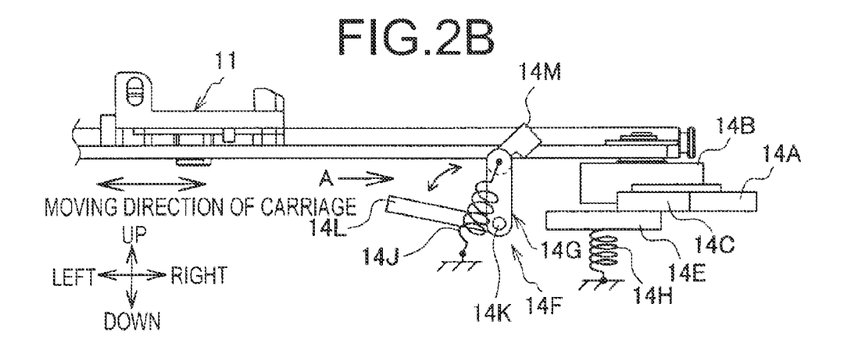
FIG. 2B is a front view illustrating the operations of the image forming apparatus in the embodiment according to one or more aspects of the present invention.
Figure 2C:
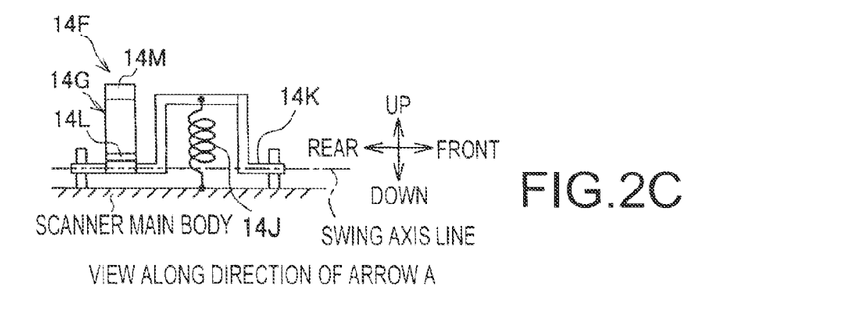
FIG. 2C is a side view of a swing arm when viewed along a direction of an arrow A shown in FIG. 2B in the embodiment according to one or more aspects of the present invention.

2.2 Structure of Driving Force Transmission Mechanism (see FIGS. 2A to 2C)

The driving force transmission mechanism 13 is configured to convey the driving force from the electric motor 30 to the driving pulley 12A to reciprocate the carriage 11. The driving force transmission mechanism 13 includes a rotation control mechanism 14 for controlling the rotational direction of the driving pulley 12A and a transmission mechanism 15 configured to convey the driving force supplied from the electric motor to the rotation control mechanism 14.

<Rotation Control Mechanism>

The rotation control mechanism 14 includes an input gear 14A, an output gear 14B, a planetary gear 14C, an intermediate gear 14E, and a displacement mechanism 14F. The input gear 14A is a spur gear configured to rotate when receiving the driving force from the electric motor 30 via the transmission mechanism 15.

The output gear 14B is a spur gear configured to output a rotational force to the driving pulley 12A. In the embodiment, the output gear 14B is disposed coaxially with the driving pulley 12A and formed integrally with the driving pulley 12A.

The planetary gear 14C is configured to always engage with the input gear 14A. The planetary gear 14C includes a rotational shaft supported by an arm 14D swingably around a rotational axis $O_1$ of the input gear 14A. Thereby, the planetary gear 14C is allowed to swing between a position where the planetary gear 14C engages with the output gear 14B (see FIG. 2A) and a position where the planetary gear 14C is separated from the output gear 14B (see FIG. 4A).

The intermediate gear 14E is a spur gear configured to reverse the rotational direction of the rotational force transmitted to the planetary gear 14C and convey the rotational force to the output gear 14B. The intermediate gear 14E is allowed to be translated along a direction parallel to a rotational axis thereof.

The input gear 14A, the output gear 14B, and the intermediate gear 14E are fixedly attached to the scanner main body. Therefore, the input gear 14A and the output gear 14B rotate while maintaining their positions relative to the scanner main body. The intermediate gear 14E rotates while maintaining its position relative to the scanner main body, unless otherwise translated along the rotational axis direction thereof.

Figure 4A:
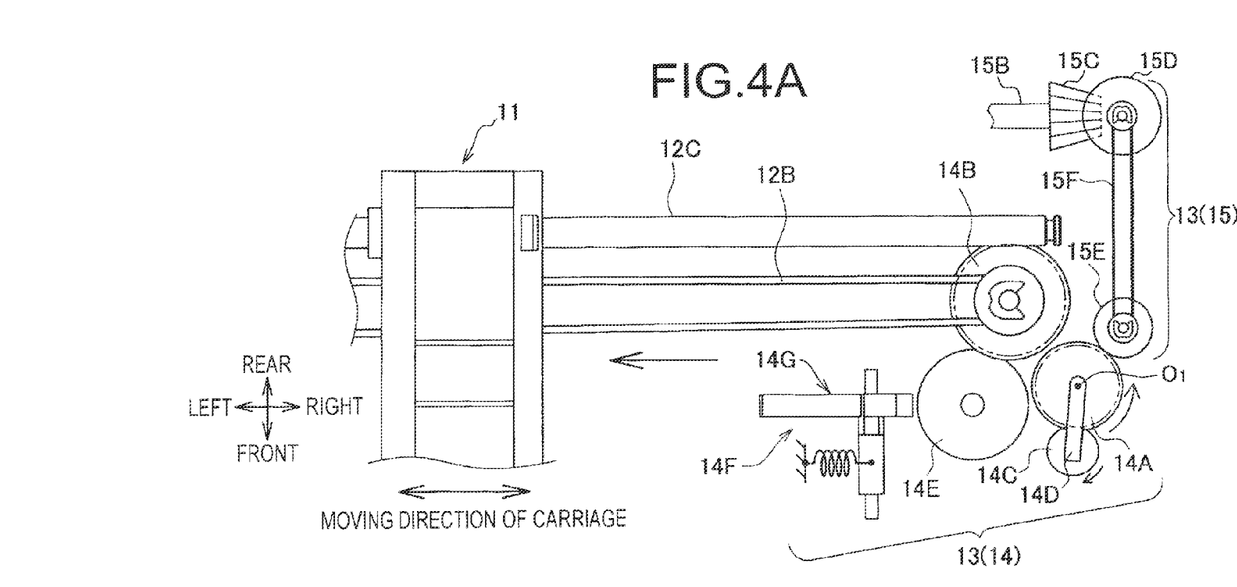
FIG. 4A is a top view illustrating operations of the image forming apparatus in the embodiment according to one or more aspects of the present invention.
Figure 4B:
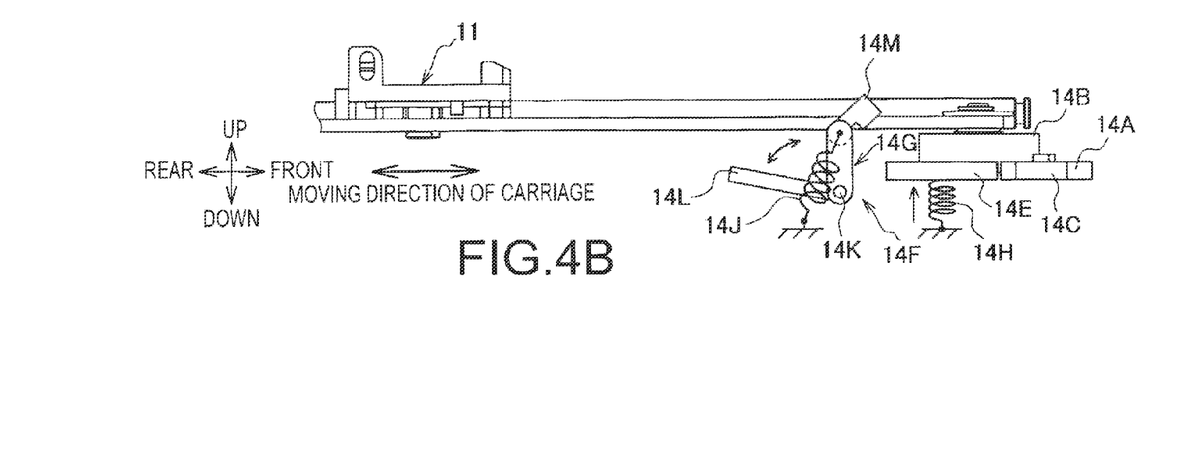
FIG. 4B is a front view illustrating the operations of the image forming apparatus in the embodiment according to one or more aspects of the present invention.

In order to establish engagement between the intermediate gear 14E and the output gear 14B, as shown in FIG. 4B, the planetary gear 14C is required to swing to the position separated from the output gear 14B. Meanwhile, when the planetary gear 14C engages with the output gear 14B, as shown in FIG. 2B, the intermediate gear 14E is not allowed to engage with the output gear 14B as the planetary gear 14C disturbs the engagement of the intermediate gear 14E with the output gear 14B.

<Displacement Mechanism>

As shown in FIG. 2B, the displacement mechanism 14F includes a swing arm 14G swingably supported by the scanner main body, a first spring 14H configured to apply an elastic force to the intermediate gear 14E, and a second spring 14J configured to apply an elastic force to the swing arm 14G.

The swing arm 14G is formed to bend substantially in a V-shape or an L-shape when viewed a swing axis direction thereof (in the embodiment, the front-to-rear direction). At the bending portion, a swing shaft 14K of the swing arm 14G is provided. An axis line direction of the swing shaft 14K, i.e., a swing axis line direction is perpendicular to the moving direction of the carriage 11 and parallel to a longitudinal direction (in the embodiment, the horizontal direction) of the carriage 11.

Therefore, the swing arm 14G is allowed to swing between a first side (e.g., the left side in FIG. 2B) and a second side (e.g., the right side in FIG. 2B) in parallel with the moving direction of the carriage 11.

The swing arm 14G includes a first contact portion 14L provided at a distal end thereof and a second contact portion 14M provided at another distal end thereof. The first contact portion 14L and the second contact portion 14M are configured to collide against the moving carriage 11. As shown in FIG. 2C, the swing shaft 14K is formed to bend in a crank shape protruding toward the side of the second contact portion 14M.

The second spring 14J is a coil spring. One end of the second spring 14J is connected with a region of the swing shaft 14K that is deviated away from the swing center axis of the swing shaft 14K toward the second contact portion 14M. The other end of the second spring 14J is fixed to the scanner main body.

The fixed end of the second spring 14J is set to such a position that the second spring 14J is the most deformed elastically in the middle of the swing motion of the swing arm 14G from the first side to the second side. It is noted that, in the embodiment, when the second spring 14J substantially overlaps the swing shaft 14K when viewed along the swing axis line direction of the swing shaft 14K, the second spring 14J is the most extended (hereinafter referred to as the most deformed state).

Therefore, for example, when the swing arm 14G is swung from the first side to the second side, the swing arm 14G reaches the second side through the most deformed state of the second spring 14J. Thus, before put into the most deformed state, the second spring 14J applies such an elastic force as to pull the swing arm 14G back to the first side. Meanwhile, after beyond the most deformed state, the second spring 14J applies such an elastic force as to urge the swing arm 14G toward the second side.

On the contrary, when the swing arm 14G is swung from the second side to the first side, before put into the most deformed state, the second spring 14J applies such an elastic force as to pull the swing arm 14G back to the second side. Meanwhile, after beyond the most deformed state, the second spring 14J applies such an elastic force as to urge the swing arm 14G toward the first side.

In the embodiment, the first contact portion 14L is formed to have such a size and a shape as to keep in contact with the carriage 11 at least until the second spring 14J is beyond the most deformed state when the carriage 11 moves from the second side (the right side in FIG. 2B) to the first side (the left side in FIG. 2B) to collide against the first contact portion 14L.

In the same manner, the second contact portion 14M is formed to have such a size and a shape as to keep in contact with the carriage 11 at least until the second spring 14J is beyond the most deformed state when the carriage 11 moves from the second end (the left end in FIG. 2B) to the first end (the right end in FIG. 2B) in the moving direction to collide against the second contact portion 14M.

Further, as shown in FIG. 2B, the first spring 14H always applies, to the intermediate gear 14E, an elastic force to urge the intermediate gear 14E to move toward a position (in the embodiment, an upper side) where the intermediate gear 14E engages with the output gear 14B. Moreover, in the embodiment, the first spring 14H is a compression coil spring having one end fixed to the scanner main body and another end to apply an elastic force to the intermediate gear 14E.

When the planetary gear 14C engages with the output gear 14B, as shown in FIG. 2B, although the elastic force of the first spring 14H is applied to the intermediate gear 14E, the intermediate gear 14E is not allowed to move to such a position (hereinafter referred to as an engagement position) that the intermediate gear 14E can engage with the output gear 14B, since the intermediate gear 14E contacts the planetary gear 14C and the contact therebetween prevents the intermediate gear 14E from moving to the engagement position.

Namely, when the planetary gear 14C engages with the output gear 14B, the planetary gear 14C serves as a stopper to keep the intermediate gear 14E from moving to the engagement position.

However, as shown in FIG. 4A, when the planetary gear 14C moves to the position separated from the output gear 14B, the planetary gear 14C does not serve as the stopper any more. Thus, as shown in FIG. 4B, the intermediate gear 14E is moved by the elastic force of the first spring 14H to the engagement position, in which the intermediate gear 14E engages with the output gear 14B.

Figure 3A:
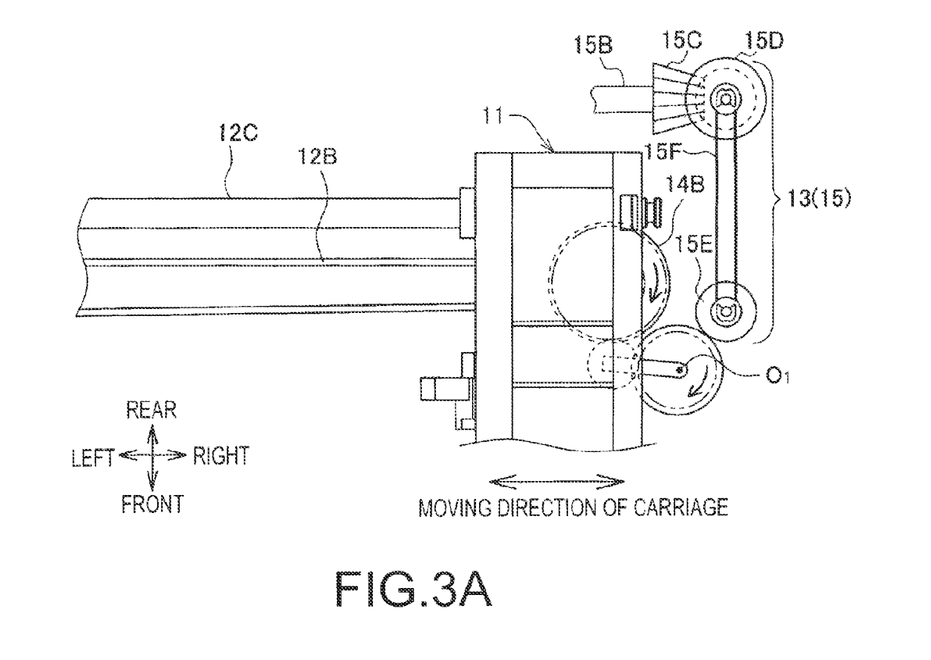
FIG. 3A is a top view illustrating operations of the image forming apparatus in the embodiment according to one or more aspects of the present invention.
Figure 3B:
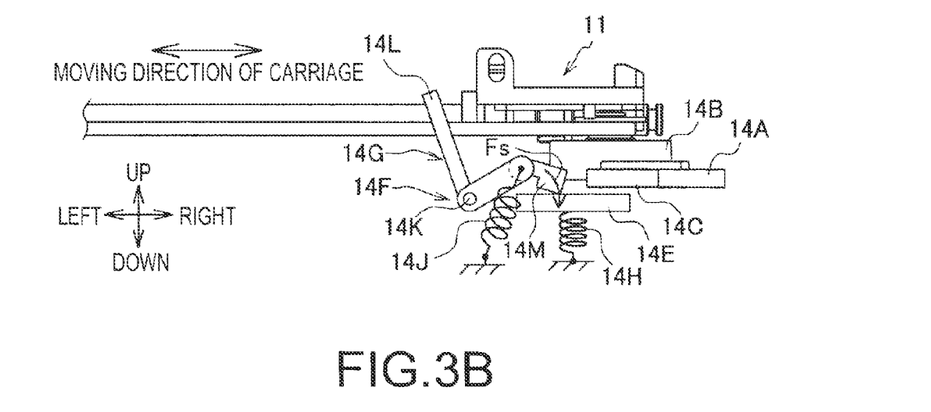
FIG. 3B is a front view illustrating the operations of the image forming apparatus in the embodiment according to one or more aspects of the present invention.

In addition, when the swing arm 14G is swung from the first side to the second side, as shown in FIG. 3B, the second contact portion 14M of the swing arm 14G comes into contact with the intermediate gear 14E. Further, at this time, the second spring 14J applies, to the swing arm 14G, such an elastic force Fs as to urge the swing arm 14G to swing further toward the second side (the right side in FIG. 2B).

Therefore, the swing arm 14G compresses the first spring 14H while resisting the elastic force of the first spring 14H, and causes the intermediate gear 14E to move to such a position (hereinafter referred to as a separated position) that the intermediate gear 14E cannot engage with the output gear 14B.

<Transmission Mechanism>

As shown in FIG. 2A, the transmission mechanism 15 is configured to transmit, to the rotation control mechanism 14, the driving force supplied from the electric motor 30 disposed in the printing unit 5. The transmission mechanism 15 includes a driving shaft 15B, two bevel gears 15C and 15D, an outputting gear 15E, and a second belt 15F.

As shown in FIG. 1, the driving shaft 15B is configured to receive the driving force from the electric motor 30 via the first belt 15A and rotate. The driving shaft 15B is disposed coaxially with a swing axis (not shown) that allows the scanning unit 10 to be swingable relative to the printing unit 5.

Therefore, even when the scanning unit 10 is swung relative to the printing unit 5, the position of the driving shaft 15B relative to the scanning unit 10 and the printing unit 5 is unchanged. Thus, the swing motion of the scanning unit 10 does not cause an operational failure of the transmission mechanism 15.

As shown in FIG. 2A, the two bevel gears 15C and 15D are configured to change the rotational axis direction of the driving force transmitted to the driving shaft 15B. The outputting gear 15E is configured to always engage with the input gear 14A.

The second belt 15F is wound around a pair of pulleys, i.e., a pulley integrated with the bevel gear 15D and a pulley integrated with the outputting gear 15E, so as to convey the driving force transmitted to the bevel gear 15D.

3. Control of Electric Motor 3.1 Controller

Figure 7:
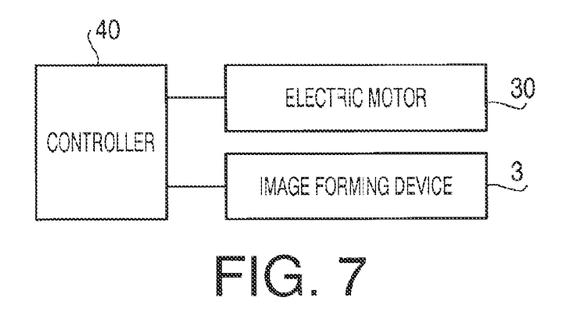
FIG. 7 is a block diagram of a control system of the image forming apparatus in the embodiment according to one or more aspects of the present invention.

As shown in FIG. 7, electrical components of the electric motor 30 are controlled by a controller 40. The controller 40 is configured to control the electric motor 30 in accordance with a previously stored program.

The controller 40 includes a microcomputer that includes a CPU, a ROM, and a RAM. The program for controlling the electric motor 30 is previously stored on a non-volatile storage device such as the ROM. When the image forming apparatus 1 is powered on, the program is read from the ROM and executed by the CPU.

3.2 Details about Control of Electric Motor

In the embodiment, the rotational direction of the electric motor 30 is changed between when image reading is performed by the scanning unit 10 (i.e., when the carriage 11 is moved) and when image formation is performed by the image forming device 3.

Hereinafter, a rotational direction of the electric motor 30 for moving the carriage 11 will be referred to as a normal direction. Meanwhile, a rotational direction of the electric motor 30 for image formation by the image forming device 3 will be referred to as a reverse direction. The one-way clutch 30B is configured to transmit a rotational force in the reverse direction and block a rotational force in the normal direction.

<Control of Electric Motor in Image Reading>

When the scanning unit 10 does not operate, as shown in FIG. 3A, the carriage 11 is located at the first end (in the embodiment, the right end) in the moving direction. Further, at this time, as shown in FIG. 3B, the swing arm 14G is in such a state as to put the intermediate gear 14E into the separated position (hereinafter, the state of the swing arm 14G will be referred to as a state where the swing arm 14G is in a separation position). Moreover, hereinafter, the state where the carriage 11 is located in the first end in the moving direction and the swing arm 14G is in the separation position will be referred to as a "home position."

Figure 8:
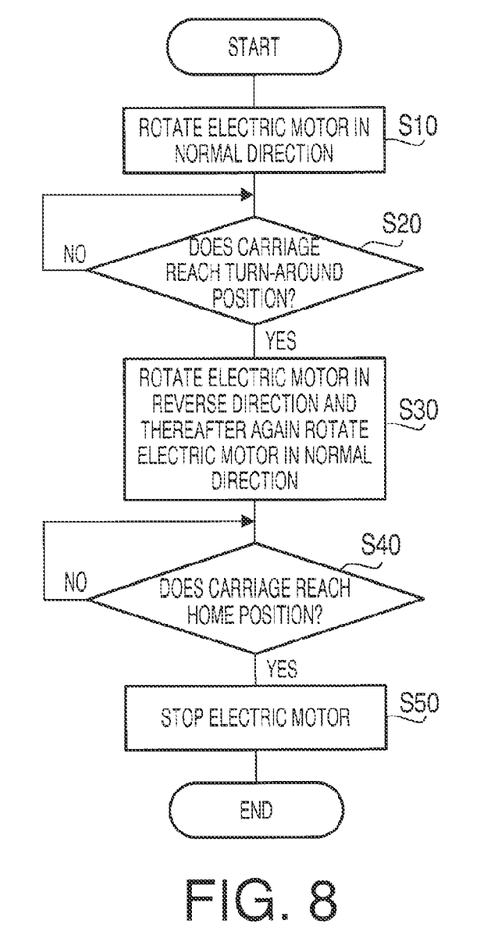
FIG. 8 is a flowchart showing a procedure of a control process to control an electric motor of the image forming apparatus in the embodiment according to one or more aspects of the present invention.

A program, shown in FIG. 8, for controlling the electric motor 30 is stored, for instance, on the ROM included in the controller 40. Upon receipt of an instruction to start image reading, the CPU (the controller 40) loads and executes the program.

Upon receipt of the instruction to start image reading, (the CPU of) the controller 40 controls the electric motor 30 to rotate in the normal direction (S10). Thereby, as shown in FIG. 3A, the input gear 14A rotates clockwise in the same figure, and the planetary gear 14C revolves clockwise around the rotational center axis $O_1$ of the input gear 14A so as to engage with the output gear 14B. Therefore, the carriage 11 begins to move from the home position toward the second end (in the embodiment, the left end) in the moving direction.

At this time, a leading end of the carriage 11 moving toward the second end collides against the first contact portion 14L. Hence, when the movement of the carriage 11 toward the second end proceeds, as shown in FIG. 2B, the second contact portion 14M of the swing arm 14G is put into a position away from the intermediate gear 14E.

The planetary gear 14C engages with the output gear 14B. Therefore, owing to the planetary gear 14C functioning as the stopper, the intermediate gear 14E is maintained in the separated position. It is noted that hereinafter, the state of the swing arm 14G shown in FIG. 2B will be referred to as a "state where the swing arm 14G is in an engageable position."

When the electric motor 30 begins to be rotated in the normal direction (S10), the controller 40 determines whether the carriage 11 has reached a turn-around position, namely, whether it is time to reverse the moving direction of the carriage 11 (S20).

It is noted that, in the embodiment, a pulse motor is employed as the electric motor 30. Therefore, the controller 40 determines whether the carriage 11 has reached a turn-around position based on whether the number of driving pulses has become such a number as to make the carriage 11 reach the turn-around position. However, for example, the controller 40 may determine whether the carriage 11 has reached a turn-around position based on a detection value from an encoder that detects a rotational angle of the driving pulley 12A or a linear encoder that detects a moving amount of the carriage 11.

At this time, when determining that the carriage 11 has not reached the turn-around position (S20: No), the controller 40 continues to control the electric motor 30 to rotate in the normal direction. Meanwhile, when determining that the carriage 11 has reached the turn-around position (S20: Yes), the controller 40 controls the electric motor 30 to stop the rotation in the normal direction, then rotate in the reverse direction for a predetermined time period, and thereafter again rotate in the normal direction (S30).

Thereby, as shown in FIG. 4A, the input gear 14A rotates counterclockwise in the same figure, and the planetary gear 14C revolves counterclockwise around the rotational center axis $O_1$ of the input gear 14A so as to be separated from the output gear 14B.

Therefore, since the planetary gear 14C does not serve as the stopper any more, as shown in FIG. 4B, the intermediate gear 14E is moved by the elastic force from the first spring 14H to the engagement position, in which the intermediate gear 14E engages with the output gear 14B.

Figure 5A:
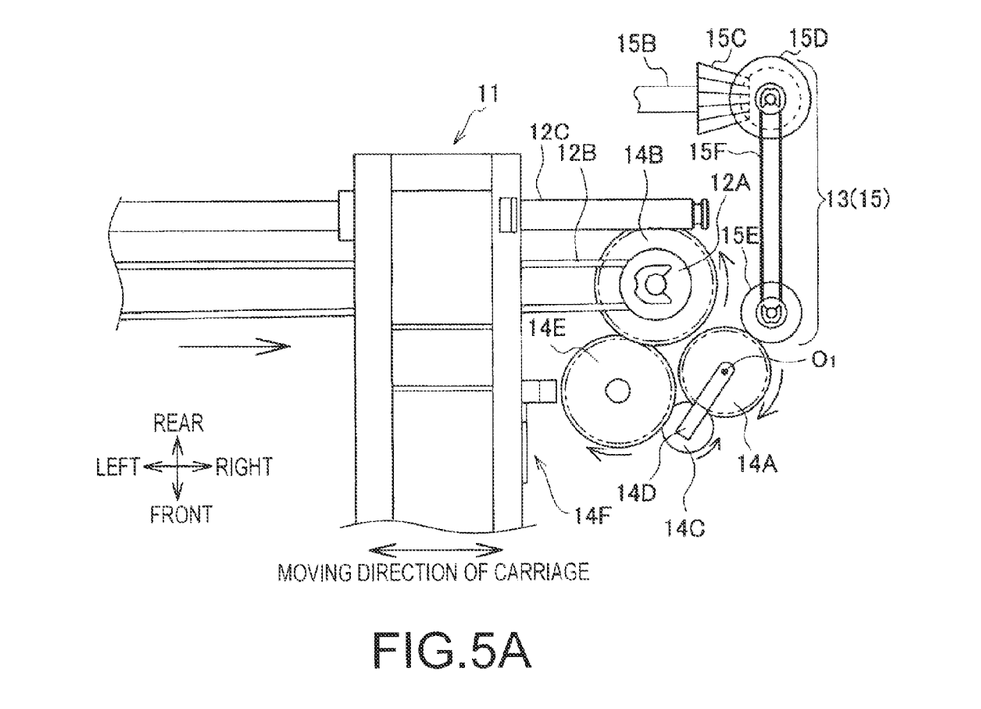
FIG. 5A is a top view illustrating operations of the image forming apparatus in the embodiment according to one or more aspects of the present invention.

Thereafter, since the electric motor 30 is again rotated in the normal direction, as shown in FIG. 5A, the input gear 14A rotates clockwise in the same figure, and the planetary gear 14C revolves clockwise around the rotational center axis $O_1$ of the input gear 14A so as to engage with the intermediate gear 14E.

Accordingly, the rotational direction of the rotational force transmitted to the planetary gear 14C is reversed by the intermediate gear 14E, and then the rotational force is conveyed to the output gear 14B. Thus, the output gear 14B is rotated in the reverse direction, and the carriage 11 begins to move from the turn-around position (in the embodiment, on a side of the left end) toward the home position.

Figure 5B:
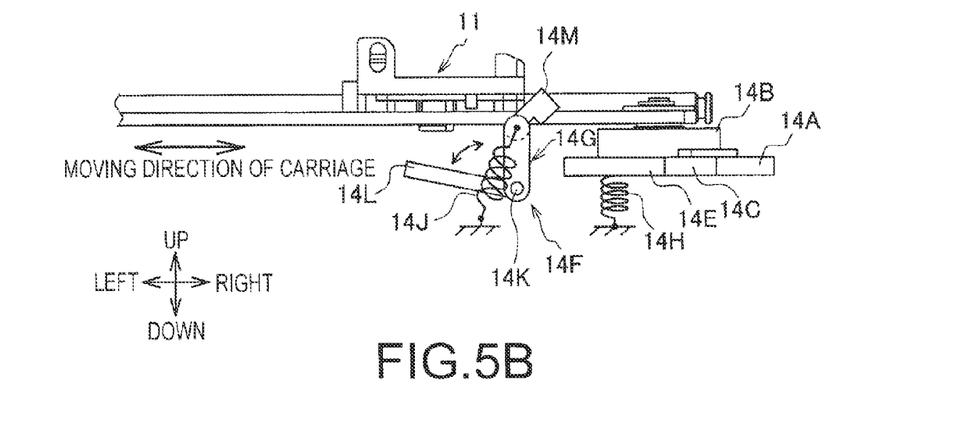
FIG. 5B is a front view illustrating the operations of the image forming apparatus in the embodiment according to one or more aspects of the present invention.
Figure 6A:
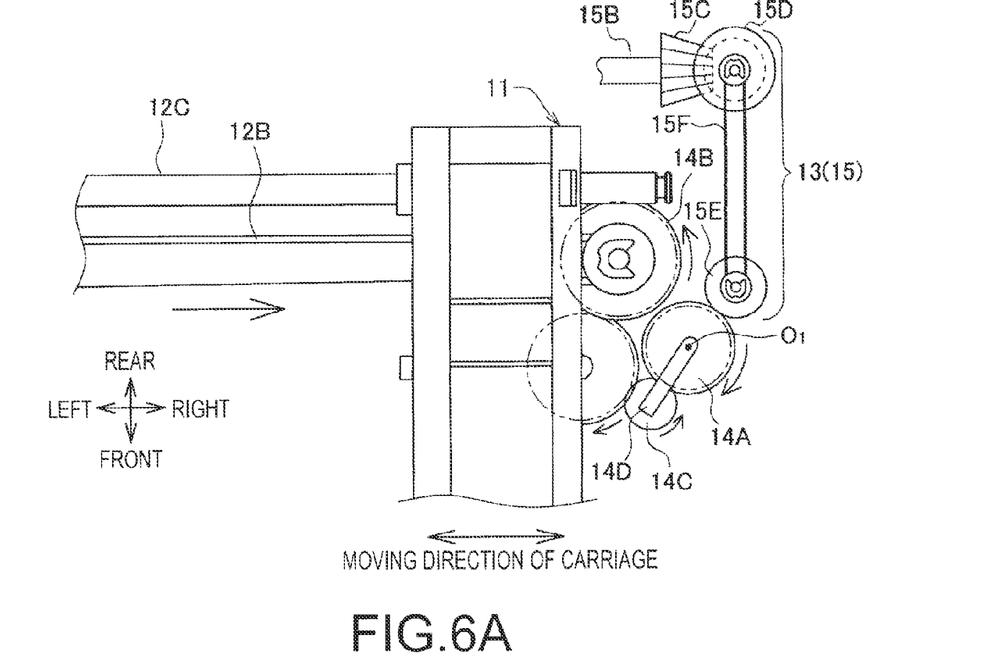
FIG. 6A is a top view illustrating operations of the image forming apparatus in the embodiment according to one or more aspects of the present invention.
Figure 6B:
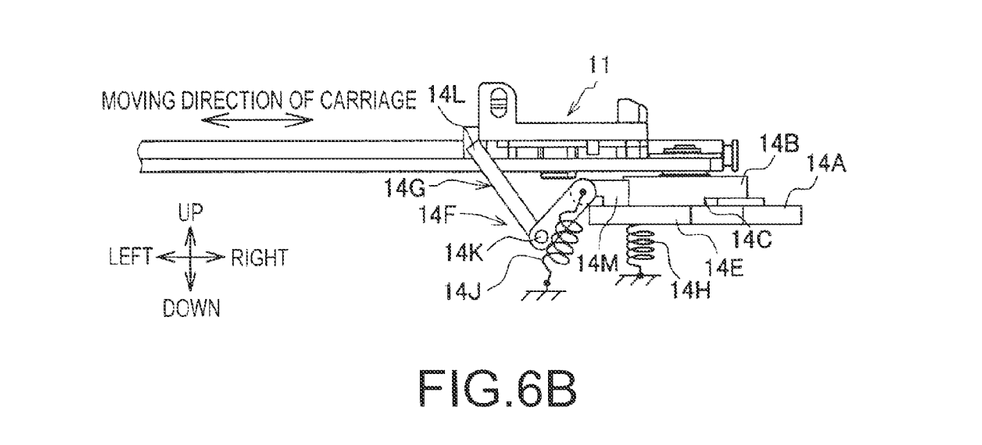
FIG. 6B is a front view illustrating the operations of the image forming apparatus in the embodiment according to one or more aspects of the present invention.

At this time, as shown in FIG. 5B, the leading end of the carriage 11 moving toward the home position collides against the second contact portion 14M. Hence, when the movement of the carriage 11 toward the home position proceeds, as shown in FIG. 6B, the swing arm 14G is moved from the engageable position to the separation position (i.e., caused is transition from the state where the swing arm 14G is in the engageable position to the state where the swing arm 14G is in the separation position).

Then, the controller 40 determines whether the carriage 11 has reached the home position in the same manner as applied in S20 (S40). When determining that the carriage 11 has not reached the home position (S40: No), the controller 40 continues to control the electric motor 30 to rotate in the normal direction. Meanwhile, when determining that the carriage 11 has reached the home position (S40: Yes), the controller 40 stops driving the electric motor 30 (S50).

Thereby, since the swing arm 14G is finally in the separation position (the state where the swing arm 14G is in the separation position), the intermediate gear 14E is moved from the engagement position to the separated position. Further, the planetary gear 14C is restored to the state where the planetary gear 14C can engage with the output gear 14B.

It is noted that the predetermined time period for which the electric motor 30 is rotated in the reverse direction is determined as a time period required for a process that the planetary gear 14C is separated from the output gear 14B and the intermediate gear 14E is moved to the engagement position. Specifically, the predetermined time period is about 0.5 seconds to 0.8 seconds.

<Control of Electric Motor in Image Formation>

When image formation is performed by the printing unit 5, the electric motor 30 is continuously driven to rotate in the reverse direction.

Thereby, as shown in FIG. 4A, the input gear 14A rotates counterclockwise in the same figure, and the planetary gear 14C revolves counterclockwise around the rotational center axis $O_1$ of the input gear 14A so as to maintain the state separated from the output gear 14B. Therefore, transmission of the driving force to the output gear 14B is blocked. Accordingly, the driving force is transmitted to movable members of the printing unit 5 such as the photoconductive drum 3A while transmission of the driving force to the scanning unit 10 is blocked.

It is noted that when the electric motor 30 is continuously driven to rotate in the reverse direction, the planetary gear 14C keeps revolving counterclockwise in FIG. 4A around the rotational center axis $O_1$ of the input gear 14A. In the embodiment, a stopper (not shown) is provided to prevent the planetary gear 14C from continuing to revolve.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

(Modifications)

In the aforementioned embodiment, when the carriage 11 collides with the first contact portion 14L, the intermediate gear 14E is moved. However, the displacement mechanism 14F may include a cam mechanism or a link mechanism that is configured to operate in conjunction with movement of the carriage 11.

In the aforementioned embodiment, the one-way clutch 30B is provided at an upstream side relative to the photoconductive drum 3A on the transmission pathway. For example, the image forming apparatus 1 may be configured without the one-way clutch 30B. In this case, the image forming apparatus 1 may be configured such that when the planetary gear 14C revolves counterclockwise (when viewed from the top) around the rotational center axis $O_1$ of the input gear 14A to be separated from the output gear 14B, the driving force is transmitted from the planetary gear 14C in this state to the photoconductive drum 3A.

In the aforementioned embodiment, by the function of the one-way clutch 30B, only the driving force in one rotational direction is transmitted to the side of the photoconductive drum 3A, and transmission of the driving force in the other rotational direction is blocked. However, the same function as the one-way clutch 30B may be achieved using a planetary gear.

In the aforementioned embodiment, the photoconductive drum 3A of the image forming apparatus 1 is cited as an example of the movable members. Nonetheless, examples of the movable members may include a feed roller of an automatic document feeder configured to feed to a reading device a document sheet to be read.

What is claimed is:

1. An image reading device comprising:
   a carriage configured to reciprocate between a first end and a second end in a moving direction to read a document sheet;

a motor configured to supply a driving force to move one of the carriage and a movable member other than the carriage;

an input gear configured to rotate upon receiving the driving force from the motor;

an output gear configured to output a rotational force toward the carriage;

a planetary gear configured to rotate in engagement with the input gear, the planetary gear being supported to be swingable around a rotational center axis of the input gear between a position where the planetary gear engages with the output gear and a position where the planetary gear is separated from the output gear;

an intermediate gear movable between an engagement position where the intermediate gear engages with the output gear and a separated position where the intermediate gear is separated from the output gear, the intermediate gear being configured to, when being in the engagement position, engage with the planetary gear, reverse a rotational direction of the driving force transmitted to the planetary gear, and transmit the driving force to the output gear;

a displacement mechanism configured to apply an urging force to urge the intermediate gear toward the engagement position and move the intermediate gear in response to movement of the carriage; and a controller configured to control the motor, wherein, when the carriage is moved from the first end to the second end in the moving direction, the displacement mechanism moves the intermediate gear from the engagement position to the separated position in response to the movement of the carriage, and the controller controls the motor to rotate in a first direction so as to transmit the driving force from the motor to the output gear via the input gear and the planetary gear, and wherein, when the carriage reaches the second end in the moving direction, the controller controls the motor to:
once stop;
then rotate in a second direction opposite to the first direction such that the planetary gear swings to the position separated from the output gear and that the intermediate gear is moved to the engagement position by the urging force from the displacement mechanism; and
thereafter again rotate in the first direction so as to transmit the driving force from the motor to the output gear via the input gear, the planetary gear, and the intermediate gear.

2. The image reading device according to claim 1, wherein the displacement mechanism comprises:
a displacement member configured to be displaced in response to contact with the carriage moving and move the intermediate gear in response to the displacement of the displacement member; and
a first elastic member configured to apply the urging force to urge the intermediate gear toward the engagement position.

3. The image reading device according to claim 2, wherein the displacement member comprises:
a swing arm swingably supported by a main body of the image reading device, the swing arm being configured to swing between a first position and a second position in response to a distal end of the swing arm contacting the carriage; and
a second elastic member having an end fixed to the main body of the image reading device and an end connected with a position of the swing arm that is deviated away from a swing center axis of the swing arm toward the distal end of the swing arm, the end of the second elastic member fixed to the main body being set to such a position that the second elastic member is the most deformed in a middle of a swing motion of the swing arm from the first position to the second position.

4. The image reading device according to claim 1, wherein the intermediate gear is configured to move along a rotational axis direction thereof.

5. The image reading device according to claim 1, wherein when the motor is continuously rotated in the second direction, the planetary gear is separated from the intermediate gear and the output gear.

6. An image forming apparatus comprising:
an image forming unit comprising a movable member, the image forming unit being configured to form an image on a sheet;
an image reading device comprising a carriage configured to reciprocate between a first end and a second end in a moving direction to read a document sheet; and
a single motor configured to supply a driving force to move one of the movable member of the image forming unit and the carriage of the image reading device;
wherein the image reading device further comprises:
an input gear configured to rotate upon receiving the driving force from the motor;
an output gear configured to output a rotational force toward the carriage;
a planetary gear configured to rotate in engagement with the input gear, the planetary gear being supported to be swingable around a rotational center axis of the input gear between a position where the planetary gear engages with the output gear and a position where the planetary gear is separated from the output gear;
an intermediate gear movable between an engagement position where the intermediate gear engages with the output gear and a separated position where the intermediate gear is separated from the output gear, the intermediate gear being configured to, when being in the engagement position, engage with the planetary gear, reverse a rotational direction of the driving force transmitted to the planetary gear, and transmit the driving force to the output gear;
a displacement mechanism configured to apply an urging force to urge the intermediate gear toward the engagement position and move the intermediate gear in response to movement of the carriage; and
a controller configured to control the motor,
wherein, when the carriage is moved from the first end to the second end in the moving direction, the displacement mechanism moves the intermediate gear from the engagement position to the separated position in response to the movement of the carriage, and the controller controls the motor to rotate in a first direction so as to transmit the driving force from the motor to the output gear via the input gear and the planetary gear, and
wherein, when the carriage reaches the second end in the moving direction, the controller controls the motor to:
once stop;
then rotate in a second direction opposite to the first direction such that the planetary gear swings to the position separated from the output gear and that the intermediate gear is moved to the engagement position by the urging force from the displacement mechanism; and thereafter again rotate in the first direction so as to transmit the driving force from the motor to the output gear via the input gear, the planetary gear, and the intermediate gear.

7. The image forming apparatus according to claim 6, wherein the displacement mechanism comprises:
   a displacement member configured to be displaced in response to contact with the carriage moving and move the intermediate gear in response to the displacement of the displacement member; and
   a first elastic member configured to apply the urging force to urge the intermediate gear toward the engagement position.

8. The image forming apparatus according to claim 7, wherein the displacement member comprises:
   a swing arm swingably supported by a main body of the image reading device, the swing arm being configured to swing between a first position and a second position in response to a distal end of the swing arm contacting the carriage; and
   a second elastic member having an end fixed to the main body of the image reading device and an end connected with a position of the swing arm that is deviated away from a swing center axis of the swing arm toward the distal end of the swing arm, the end of the second elastic member fixed to the main body being set to such a position that the second elastic member is the most deformed in a middle of a swing motion of the swing arm from the first position to the second position.

9. The image forming apparatus according to claim 6, wherein the intermediate gear is configured to move along a rotational axis direction thereof.

10. The image forming apparatus according to claim 6, wherein when the motor is continuously rotated in the second direction, the planetary gear is separated from the intermediate gear and the output gear.

* * * * *